United States Patent
Mielke et al.

(10) Patent No.: US 8,388,001 B2
(45) Date of Patent: Mar. 5, 2013

(54) TRANSVERSE CONTROL ARM

(75) Inventors: Oliver Mielke, Altenbeken (DE); Tobias Ebbing, Hövelhof (DE); Florian Hessing, München (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/187,059

(22) Filed: Jul. 20, 2011

(65) Prior Publication Data
US 2012/0018974 A1    Jan. 26, 2012

(30) Foreign Application Priority Data

Jul. 21, 2010    (DE) .......................... 10 2010 031 891

(51) Int. Cl.
*B60G 7/00*    (2006.01)
(52) U.S. Cl. ................................ 280/124.134
(58) Field of Classification Search ........... 280/124.134, 280/124.135, 124.136, 124.14, 124.143, 280/124.153
See application file for complete search history.

(56) References Cited

U.S. PATENT DOCUMENTS

| | | | | |
|---|---|---|---|---|
| 5,362,090 A | * | 11/1994 | Takeuchi | 280/124.152 |
| 6,705,627 B2 | * | 3/2004 | Hasebe et al. | 280/124.134 |
| 7,703,783 B2 | * | 4/2010 | Miyawaki | 280/124.134 |
| 2002/0000705 A1 | * | 1/2002 | Tunzini | 280/124.134 |

FOREIGN PATENT DOCUMENTS

| | | |
|---|---|---|
| DE | 100 24 225 A1 | 11/2001 |
| DE | 10024225 A1 * | 11/2001 |
| DE | 10 2007 018 569 | 10/2008 |
| EP | 1 619 054 A1 | 1/2006 |
| JP | 2002 219 918 A | 8/2002 |

* cited by examiner

*Primary Examiner* — Joseph Rocca
*Assistant Examiner* — Robert A Coker
(74) *Attorney, Agent, or Firm* — Henry M Feiereisen LLC

(57) ABSTRACT

A transverse control arm for a motor vehicle is produced in one piece from a sheet metal blank. The transverse control arm includes a base body region with bearing regions formed thereon. A bearing journal is arranged in a bearing region with a material joint. The material joint is oriented in the direction of a longitudinal axis of the bearing journal, thereby providing a transverse control arm with high durability.

9 Claims, 4 Drawing Sheets

TRANSVERSE CONTROL ARM

CROSS-REFERENCES TO RELATED APPLICATIONS

This application claims the priority of German Patent Application, Serial No. 10 2010 031 891.4, filed Jul. 21, 2010, pursuant to 35 U.S.C. 119(a)-(d), the content of which is incorporated herein by reference in its entirety as if fully set forth herein.

BACKGROUND OF THE INVENTION

The present invention relates to a transverse control arm of a motor vehicle.

The following discussion of related art is provided to assist the reader in understanding the advantages of the invention, and is not to be construed as an admission that this related art is prior art to this invention.

Transverse control arms are used in the automotive industry to guide and steer wheels. The transverse control arm represents, on one hand, the connection with the bearing arrangement of the wheel and, on the other hand, the connection with the chassis of the vehicle. The bearing arrangement includes in addition to the wheel bearing and the driveshaft also a pivot bearing, a connection with the steering knuckle and with a guide joint, with the tie rod and additional elements for the steering system, the drive train, the suspension and the brake of the vehicle, During operation of the vehicle, the transverse control arm is subjected to various stresses. For this reason, more than one transverse control arm is frequently provided for each wheel. The high stress on the transverse control arm can be counteracted with a particularly solid and stable structure. However, such structure is frequently very heavy, thus increasing fuel consumption.

A weight-optimized design is possible with materials having a particularly high strength or with a combination of different materials. In particular, highly stressed bearing attachment regions may be constructed from cast parts or milled components, which are connected with a base body made of sheet steel. However, this hybrid construction has the disadvantage that the individual components must be connected with one another, resulting in disadvantageously high production costs.

Particularly the durability of a transverse control arm and hence the safety of the vehicle is a very significant point which must be considered when constructing and designing a transverse control arm. Connection regions between different components of a hybrid transverse control arm must be particularly carefully designed.

It would therefore be desirable and advantageous to provide an improved transverse control arm which obviates prior art shortcomings and which has high strength and low weight, and which is easy to produce while also having high durability.

SUMMARY OF THE INVENTION

According to one aspect of the present invention, a transverse control arm of a includes a base body region having a first bearing region and a second bearing region, a bearing journal arranged in the second bearing region and connected with the second bearing region by a material joint oriented in a direction of a longitudinal axis of the bearing journal, and two flanges coupling the bearing journal and the second bearing region, wherein one of the two flanges is constructed as a support flange and another of the two flanges is constructed as a relief flange.

According to another advantageous feature of the present invention, the bearing journal may be arranged with respect to its longitudinal axis at least with one section on or in the bearing region. A material joint in the context of the present invention is a connection produced by thermal joining. This may include, for example, a joint seam, such as a continuous or interrupted weld seam or consecutively arranged spot welds. The material joint is hereby oriented in the direction of the longitudinal axis of the bearing journal. In the context of the invention, this arrangement of the material joint has the particular advantage that all forces and moments occurring in the chassis are reliably transmitted, with simultaneously high durability of the coupling between the bearing journal and the base body. The forces and moments to be transmitted are in a range of several 100 to several 1000 Nm. In particular, loads of more than 50 kN can be transmitted.

According to another advantageous feature of the present invention, steel materials may be used for the transverse control arm. However, light-weight metallic materials can also be used. Alternatively, within the context of the invention, a hybrid transverse control arm could also be fabricated from two different materials. The material joint may, within the context of the invention, also be an adhesive seam. In general, the components may be produced from sheet metal blanks having a wall thickness between 1 and 6 mm, preferably between 2 and 4.75 mm. When using sheet metal components, within the context of the invention, the sheet metal components may also be produced by hot-forming and press-hardening. It would also be feasible within the context of the invention to at least partially heat-treat and/or anneal the bearing regions, in particular the bearing region where the bearing journal is arranged.

The bearing journal may be formed as a steel component, in particular as a cold-formed part. The diameter of the bearing journal is between 5 and 50 mm, preferably between 10 and 40 mm. Conceivably, the bearing journal may also be formed as a tubular component or as a light-weight metallic component.

The two flanges may be formed in the bearing region by a forming process, wherein the material joint is formed on at least one flange. Within the context of the invention, the term flange is to be understood as a partial region of the bearing section which is preferably produced as a single piece with the bearing region and with the base body region, respectively, with particularly a seamless transition. Within the context of the invention the flange may also be coupled to the bearing region and the base body region, respectively, at a later time. For example, a material and/or an interlocking connection may here be employed. The material joint for coupling to the bearing journal may be formed on at least one flange. The flange may thus be made from the same material as the base body, or from a metallic material.

In the context of the present invention, a welding process, for example a MIG or a MAG welding process, may be used for the material joint between the flange and the bearing journal. However, the connection may also be produced by WIG welding, manual E-welding, laser welding, laser hybrid welding or Reibrühr welding. Conceivably, the material joint may also be established by resistance welding. The material joint may be produced with or without an additive. The material joint may have a size or width, for example in form of a joint seam or in the form of spot welds, which is between 0.1 and 10 mm, preferably between 0.2 and 5 mm.

According to another advantageous feature of the present invention, one flange may be formed as a support flange while another flange may be formed as a relief flange.

The support flange has primarily the function to transmit the occurring forces from the bearing journal to the transverse control arm or from the transverse control arm to the bearing journal. The relief flange has primarily an additional support function. Within the context of the invention, a moment is produced due to the orientation of the material joint in the longitudinal direction of the bearing journal, because a gap exists between the longitudinal axis of the bearing journal and the material joint. With a free cut, the force on the bearing journal is applied fundamentally in the center of the bearing journal. Accordingly, a bending moment about the axis of the material joint is produced. This bending moment is reduced by the material joint of the bearing journal with the relief flange.

Stress and stress peaks are therefore produced in the material joint. The introduced stress can be minimized by the relief flange. The relief flange may here be arranged at a distance from the support flange, for example, on the opposite side of the longitudinal axis of the bearing journal. However, the relief flange need not be located on a straight line defined by the longitudinal axis of the bearing journal and the axis of the material joint, but should be located in a different quarter-segment or half-segment of the bearing journal.

According to another advantageous feature of the present invention, the bearing journal may have a coupling section, wherein the coupling section is materially connected with the support flange and/or the relief flange at least in sections. The material coupling with the support flange and/or with a relief flange, at least on a section of the coupling section of the bearing journal, has the advantage of providing a particularly durable connection between the bearing journal and the base body of the transverse control arm.

According to another advantageous feature of the present invention, the bearing journal may have a coupling section, wherein the coupling section is formfittingly connected with the support flange and/or the relief flange at least in sections. With the interlocking connection, the bearing journal is additionally clamped within the context of the invention. On one hand, the wheel forces can be better transmitted with the interlocking connection, and on the other hand, the strength of the produced connection can be additionally increased by a friction connection produced by the interlocking clamping connection.

According to another advantageous feature of the present invention, the relief flange may have on its end a collar, wherein the collar is formed in the longitudinal direction of the bearing journal at least in sections. Advantageously, the collar may extend over the entire region of the relief flange and may be formed at least in sections, advantageously over the entire section of the coupling section.

With the collar on the relief flange, stress can be uniformly distributed, thus minimizing or at least reducing stress peaks in the transition region or in the coupling region of the relief flange and the coupling section. This improves durability and reduces susceptibility to crack formation caused by continuous vibrations. Fatigue fractures are therefore largely prevented.

According to another advantageous feature of the present invention, the collar may be inverted so as to be oriented away from the bearing journal. In this way, stress of about 200 to 800 MPa, in particular from 300 to 700 MPa, are particularly advantageously transmitted. The collar and/or the end section of the collar may hereby be oriented so as to face away from the bearing journal. To this end, the collar on the relief flange may be bent, for example, with a bending radius between 1 and 30 mm. Starting from the original orientation, the collar may be bent at an angle between 1 and 180°. Currently preferred is an angle between 50 and 150°. The collar may have a length between 1 and 100 mm and a width of about 1 to 3 mm.

According to another advantageous feature of the present invention, the bearing region may be substantially C-shaped in cross-section and may contact the coupling section at least in regions. The bearing region may have a substantially C-shaped configuration in cross-section, wherein the flanges abut the C-shaped configuration or the ends of the legs of the C-shaped configuration. This produces a configuration of the bearing region with the flanges encompassing the bearing journal.

The section-wise contact with the coupling section additionally increases the strength, which is particularly advantageous for the magnitude of the forces that can be transmitted and for the durability.

According to another advantageous feature of the present invention, a cavity may be formed between the support flange and the coupling section. The cavity makes it easier to insert and/or press the bearing journal into the transverse control arm during production. In addition, the cavity offers a relief space which has an advantageous effect on the material joint to be produced and compensates expansions of the zone affected by heat.

According to another advantageous feature of the present invention, the support flange and the collar may be oriented essentially in the same direction. Concerning the force transmission and the stress distribution, this is advantageous for the connection between the bearing journal and the transverse control arm and the durability.

In addition, an end face of the support flange preferably may be in contact with the coupling section. In this way, a material joint between the support flange and the coupling section, in particular a weld connection, is reliably formed during production with minimal waste.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
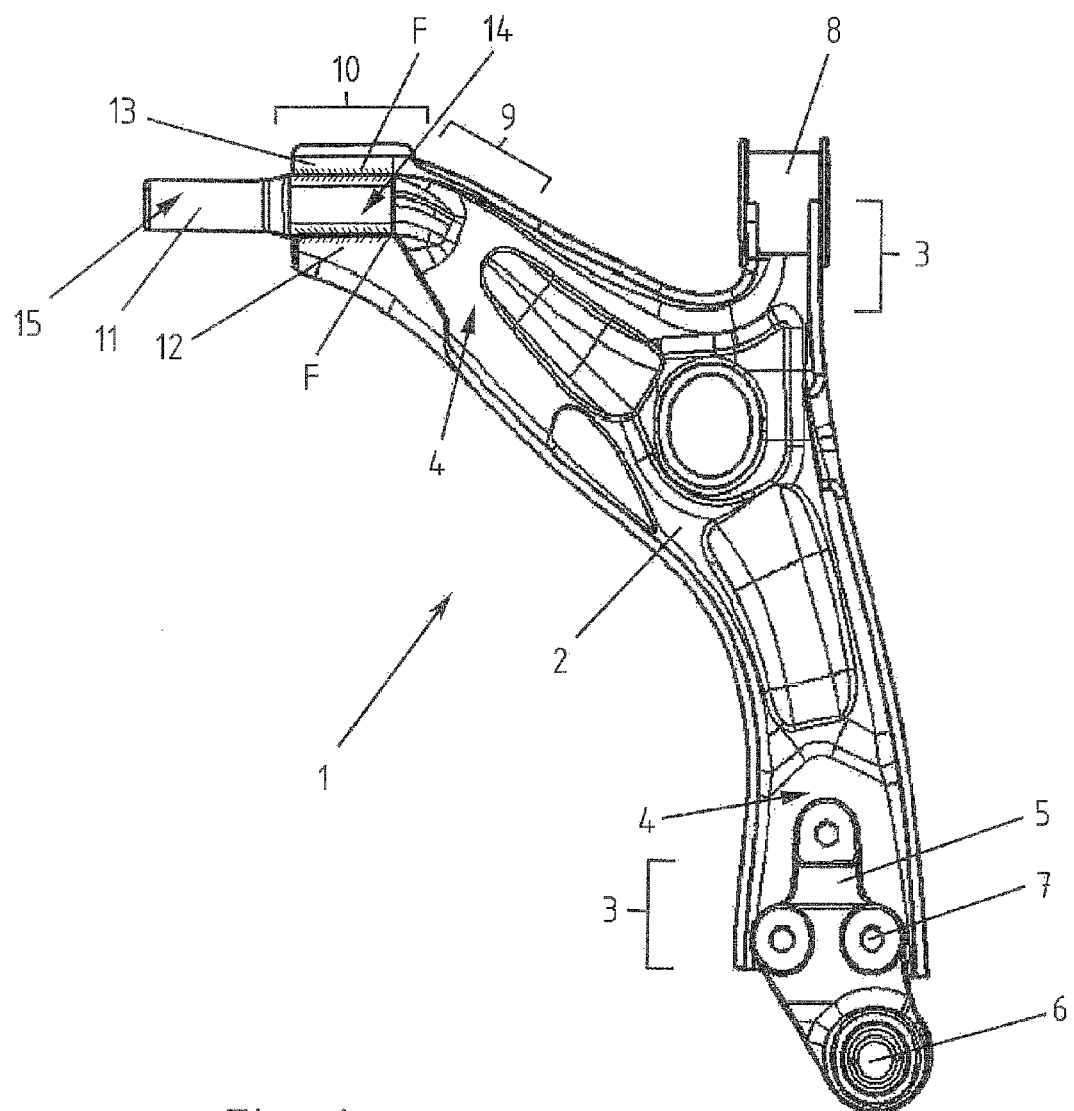
FIG. 1 shows a bottom view of a transverse control arm according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top view of a transverse control arm according to the present invention, generally designated by reference numeral 1. The transverse control arm 1 has a base body region 2 with bearing regions 3, 10 formed thereon. In this exemplary embodiment, the transverse control arm 1 has a substantially L-shaped configuration and the base body region 2 is in turn split into two leg regions 4.

The bearing region 3 has in a bottom section, in relation to the image plane, a mount 5 for a ball joint 6. The coupling is hereby established the coupling means 7. In an upper right section, in relation to the image plane, the transverse control 1 has a bearing region 3 with a bearing sleeve 8. The bearing sleeve 8 is hereby materially coupled on the bearing region 3.

The left leg region 4, in relation to the image plane, extends across a funnel-shaped transition region 9 into the bearing region 10 for coupling with a bearing journal 11. A support flange 12 and a relief flange 13 are formed in the bearing region 10. The support flange 12 and also the relief flange 13 are in contact with a corresponding coupling section 14 of the bearing journal 11.

Within the context of the invention, a material joint in form of a joint seam F is formed between the coupling section 14 and the support flange 12 as well as between the coupling section 14 and the relief flange 13. The bearing journal 11 in form of a truncated cone extends from the coupling section 14 to a journal section 15.

Figure 2:
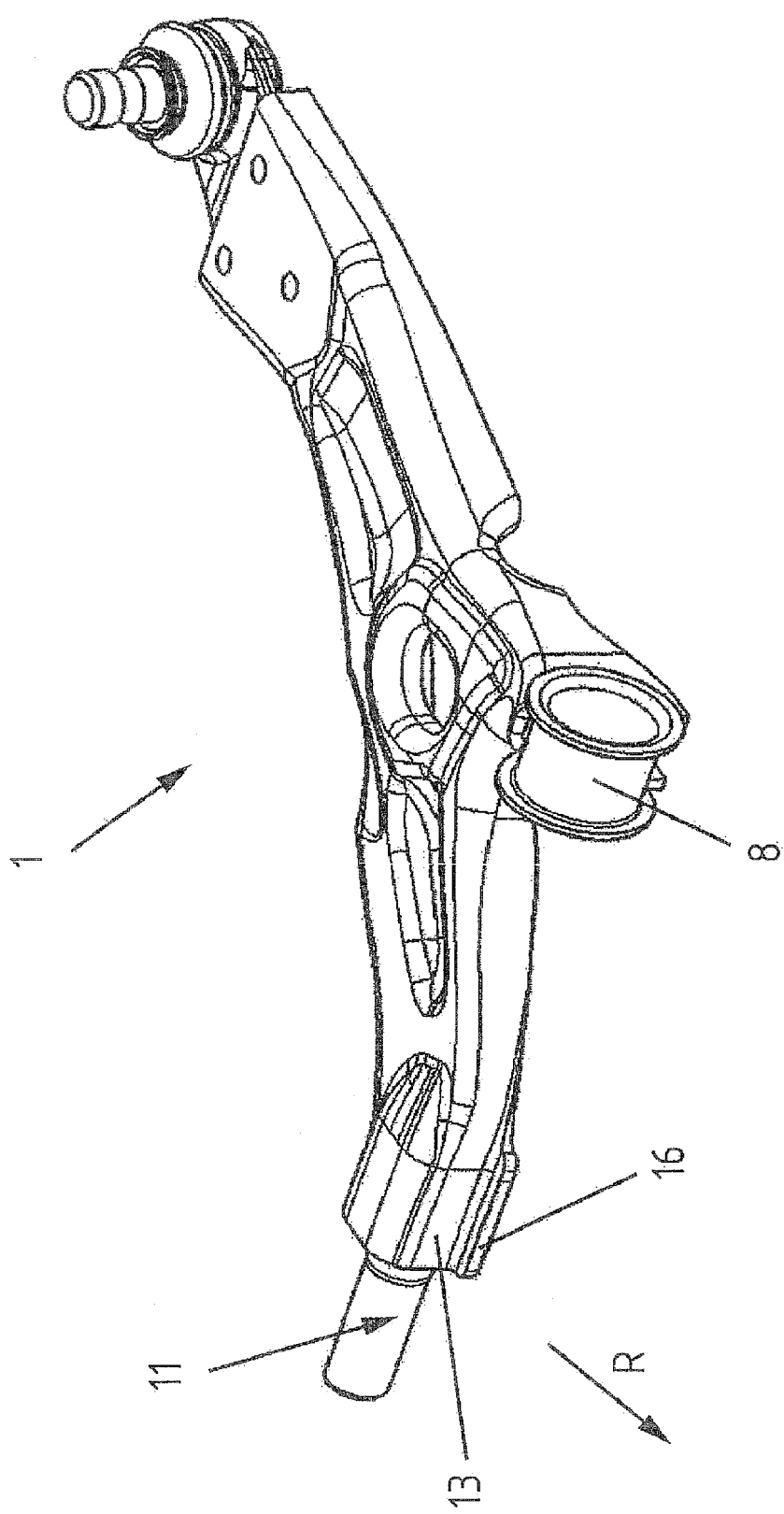
FIG. 2 shows a perspective view of the transverse control arm of FIG. 1.

FIG. 2 shows a perspective view of the transverse control arm 1. As can be seen, a collar 16 is formed in the region of the relief flange 13. The collar 16 hereby points in the direction R away from the bearing journal 11.

Figure 3:
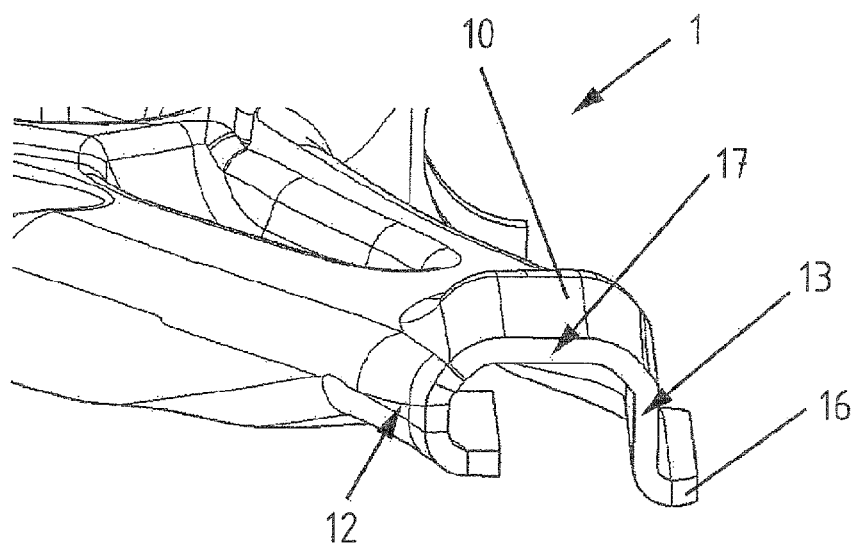
FIG. 3 shows a front view of a bearing region of a transverse control arm.

FIG. 3 shows another front view of the transverse control arm 1 with particular attention on the bearing region 10 for coupling a bearing journal 11 which is not shown in detail. As can be seen, the bearing region 10 is split into a substantially C-shaped base region 17, both in cross-section and also in a front view, with flanges in form of a support flange 12 and a relief flange 13 formed thereon. The relief flange 13 has also an outwardly bent collar 16.

Figure 4:
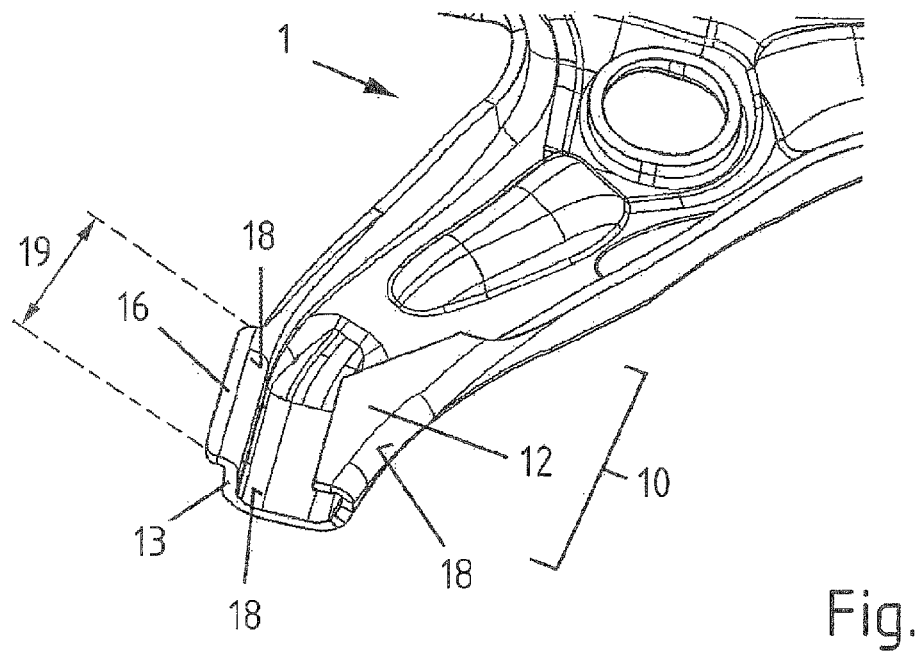
FIG. 4 shows a bottom perspective view of the bearing region of the transverse control arm.

FIG. 4 shows another perspective view of the transverse control arm 1 with particular attention on the bearing region 10. The support flange 12 and the relief flange 13 are formed in the bearing region 3 by forming. The support flange 12, like the relief flange 13, abuts the base region with a curvature 18. In addition, a collar 16 extends over the coupling region 19 of the bearing region 10 with a curvature 18.

Figure 5:
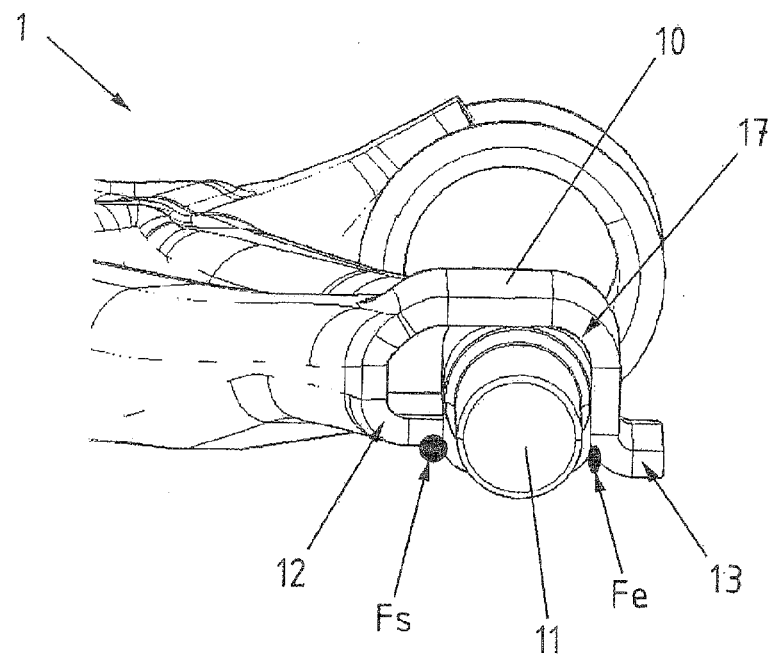
FIG. 5 shows a front view of the bearing region with inserted bearing journal.

FIG. 5 shows a front view of the transverse control arm 1 of FIG. 3, with the difference that the bearing journal 11 is here inserted. The bearing journal 11 is in interlocking contact inside the C-shaped base region 17 in the top bearing region 10, in relation to the image plane. The bearing journal 11 is coupled on both the support flange 12 and the relief flange 13 by a respective joint seam F. The joint seam Fs on the support flange 12 is hereby formed with greater strength than the joint seam Fe on the relief flange 13.

Figure 6:
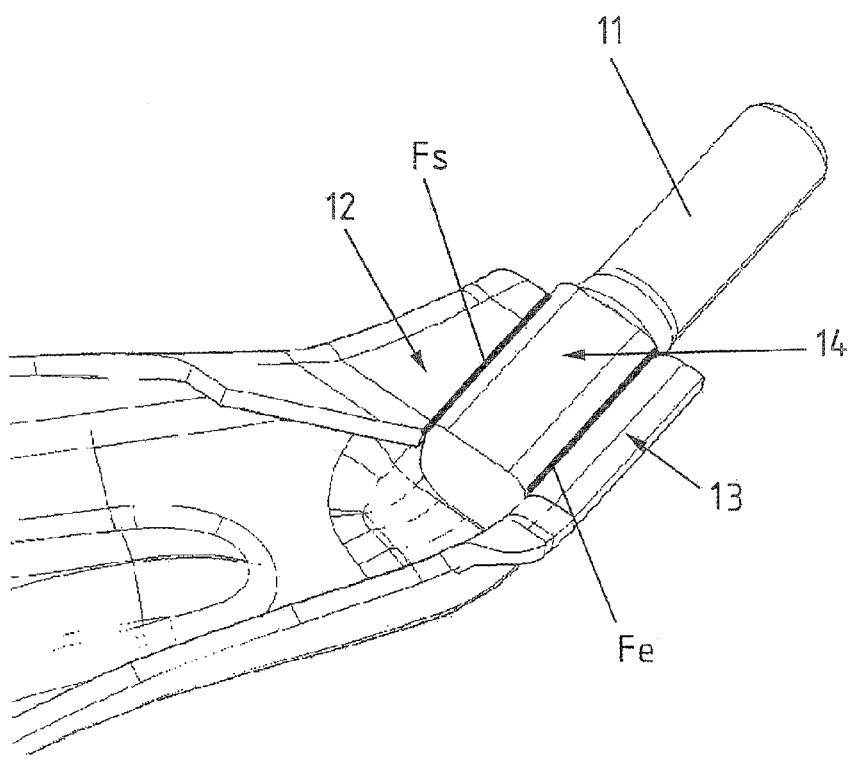
FIG. 6 shows a bottom perspective view of the bearing region with inserted bearing journal.

FIG. 6 shows the bearing region 10 with an inserted bearing journal 11 in a perspective view from below. As also indicated, the joint seam Fs of the support flange is formed so as to be continuous in the coupling section 14 of the bearing journal 11. The joint seam Fe of the relief flange 13 is also formed to be continuous in the coupling section 14 of the bearing journal 11.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A transverse control arm of a motor vehicle, produced in one piece from a sheet metal blank, comprising:
    a base body region having a first bearing region and a second bearing region, said second bearing region having in cross-section a substantially C-shaped configuration formed by a web, with a first leg extending from a first side of the web and having an outwardly bent collar forming a relief flange, and with a second leg extending from a second side of the web and having an inwardly bent extension forming a support flange;
    a bearing journal arranged in the second bearing region and connected to at least one of the support flange and the relief flange of the second bearing region by a material joint oriented in a direction of a longitudinal axis of the bearing journal.

2. The transverse control arm of claim 1, wherein the bearing journal has a coupling section connected by the material joint with at least one of the support flange and the relief flange at least in sections in the direction of the longitudinal axis of the bearing journal.

3. The transverse control arm of claim 2, wherein a cavity is formed between the support flange and the coupling section.

4. The transverse control arm of claim 1, wherein the bearing journal has a coupling section that is formfittingly connected with at least one of the support flange and the relief flange at least in sections in the direction of the longitudinal axis of the bearing journal.

5. The transverse control arm of claim 4, wherein a cavity is formed between the support flange and the coupling section.

6. The transverse control arm of claim 1, wherein the collar is formed in a longitudinal direction of the bearing journal at least in sections.

7. The transverse control arm of claim 6, wherein the outwardly bent collar and the inwardly bent extension are oriented in a substantially identical direction.

8. The transverse control arm of claim 1, wherein the material joint is continuous in the direction of the longitudinal axis of the bearing journal.

9. The transverse control arm of claim 1, wherein the bearing journal is connected to both the support flange and the relief flange.

* * * * *

UNITED STATES PATENT AND TRADEMARK OFFICE
CERTIFICATE OF CORRECTION

| | |
|---|---|
| PATENT NO. | : 8,388,001 B2 |
| APPLICATION NO. | : 13/187059 |
| DATED | : March 5, 2013 |
| INVENTOR(S) | : Oliver Mielke et al. |

It is certified that error appears in the above-identified patent and that said Letters Patent is hereby corrected as shown below:

In the Specifications:

Column 1, line 62, delete "of a".
Column 5, lines 16, 17, replace "The coupling is hereby established the coupling means 7." with --The coupling is hereby established formfittingly via coupling means 7.--.

In the Claims:

Column 6, after line 18 and before "What is claimed is", add --What is claimed as new and desired to be protected by Letters Patent is set forth in the appended claims and includes equivalents of the elements recited therein:--.

Signed and Sealed this
Fourth Day of June, 2013

Teresa Stanek Rea
*Acting Director of the United States Patent and Trademark Office*